(12) United States Patent
Dai

(10) Patent No.: US 11,102,272 B2
(45) Date of Patent: Aug. 24, 2021

(54) METHOD AND DEVICE FOR DOWNLOADING RESOURCE FILE

(71) Applicant: Wangsu Science & Technology Co., Ltd., Shanghai (CN)

(72) Inventor: Xinying Dai, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/849,715

(22) Filed: Apr. 15, 2020

(65) Prior Publication Data

US 2021/0194951 A1 Jun. 24, 2021

Related U.S. Application Data

(63) Continuation of application No. PCT/CN2020/074959, filed on Feb. 12, 2020.

(30) Foreign Application Priority Data

Dec. 19, 2019 (CN) .......................... 201911319000.7

(51) Int. Cl.
  *G06F 15/16* (2006.01)
  *H04L 29/08* (2006.01)

(52) U.S. Cl.
  CPC ............ *H04L 67/06* (2013.01); *H04L 67/104* (2013.01); *H04L 67/2842* (2013.01)

(58) Field of Classification Search
  CPC .... H04L 67/06; H04L 67/104; H04L 67/2842
  (Continued)

(56) References Cited

U.S. PATENT DOCUMENTS 6,337,715 B1 * 1/2002 Inagaki ................ H04N 21/435
  348/553
7,522,536 B2 * 4/2009 Roberts ................... H04L 29/06
  370/252

(Continued)

FOREIGN PATENT DOCUMENTS

CN  101478556 A  7/2009
CN  103428251 A  12/2013

(Continued)

OTHER PUBLICATIONS

Wangsu Science & Technology Co., Ltd., CN First Action, Chinese Application No. 201911319000.7, Jan. 4, 2021, 5 pgs.

(Continued)

*Primary Examiner* — Alicia Baturay
(74) *Attorney, Agent, or Firm* — USCH Law, PC

(57) ABSTRACT

The present disclosure discloses a method and a device for downloading a resource file, which belongs to data transmission technologies. The method is applied to a client in a peer-to-peer network, including: receiving a download request for a target resource file, and determining a data block download sequence of the target resource file (201); adjusting a download priority of each of the data blocks of the target resource file in real time according to the data block download sequence and a data block consumption progress of the target resource file (202); and downloading the data blocks of the target resource file through a plurality of download paths with different network qualities based on the adjusted download priority of each of the data blocks (203).

18 Claims, 3 Drawing Sheets

```
┌──────────────────────────────────────────────────────────┐
│ Receive a download request for a target resource file,   │──201
│ and determine a data block download sequence of the      │
│ target resource file                                     │
└──────────────────────────────────────────────────────────┘
                           │
                           ▼
┌──────────────────────────────────────────────────────────┐
│ Adjust a download priority of each of data blocks of the │──202
│ target resource file in real time according to the data  │
│ block download sequence and a data block consumption     │
│ progress of the target resource file                     │
└──────────────────────────────────────────────────────────┘
                           │
                           ▼
┌──────────────────────────────────────────────────────────┐
│ Download the data blocks of the target resource file     │──203
│ through a plurality of download paths with different     │
│ network qualities based on the adjusted download         │
│ priority of each of the data blocks                      │
└──────────────────────────────────────────────────────────┘
```

(58) Field of Classification Search
USPC .......................................................... 709/219
See application file for complete search history.

(56) References Cited

U.S. PATENT DOCUMENTS

| | | | | |
|---|---|---|---|---|
| 7,558,797 B2* | 7/2009 | Li | ........................ | H04L 67/104 |
| 7,593,333 B2* | 9/2009 | Li | ........................ | H04L 12/1854 |
| | | | | 370/232 |
| 7,756,051 B2* | 7/2010 | Rodriguez | ............ | H04L 69/329 |
| | | | | 370/252 |
| 7,920,572 B2* | 4/2011 | Bates | .................... | H04L 67/104 |
| | | | | 370/395.2 |
| 7,996,550 B2* | 8/2011 | Fischer | ................. | H04L 67/108 |
| | | | | 709/231 |
| 8,046,426 B2* | 10/2011 | Medard | ............... | H04L 67/1095 |
| | | | | 709/217 |
| 8,166,186 B2* | 4/2012 | Inokuchi | ................. | H04L 67/06 |
| | | | | 709/230 |
| 8,341,283 B2* | 12/2012 | Argawal | ............... | H04L 67/104 |
| | | | | 709/231 |
| 8,600,220 B2* | 12/2013 | Bloch | .............. | H04N 21/23439 |
| | | | | 386/296 |
| 8,838,722 B2* | 9/2014 | Ridges | ................. | H04L 67/1063 |
| | | | | 709/208 |
| 8,838,823 B2* | 9/2014 | Guo | ...................... | H04L 67/108 |
| | | | | 709/231 |
| 9,219,782 B2* | 12/2015 | Burba | ................. | H04L 67/1085 |
| 9,438,669 B2* | 9/2016 | Kim | ..................... | H04N 21/236 |
| 9,628,760 B2* | 4/2017 | Damola | ............. | H04N 21/6543 |
| 10,104,514 B2* | 10/2018 | Drake | .................... | H04L 67/14 |
| 10,110,657 B2* | 10/2018 | Mitic | .................. | H04L 65/4076 |
| 10,225,620 B1* | 3/2019 | Phillips | ............ | H04N 21/64792 |
| 10,291,681 B2* | 5/2019 | Nair | ......................... | H04L 67/02 |
| 10,313,408 B2* | 6/2019 | Phillips | .............. | H04L 65/1083 |
| 10,349,104 B2* | 7/2019 | Phillips | .............. | H04N 21/2385 |
| 10,412,467 B2* | 9/2019 | Love | .................. | H04N 21/2187 |
| 10,498,368 B2* | 12/2019 | Salomons | ........ | H04N 21/26258 |
| 10,506,262 B2* | 12/2019 | Ma | ..................... | H04L 67/2866 |
| 10,725,859 B2* | 7/2020 | Bolkhovitin | .......... | G06F 3/0646 |
| 10,761,929 B2* | 9/2020 | Bolkhovitin | ........ | G06F 11/2094 |
| 10,805,161 B2* | 10/2020 | Lockhart | ............. | H04L 41/0889 |
| 2004/0107242 A1* | 6/2004 | Vert | .................... | H04L 67/1068 |
| | | | | 709/203 |
| 2004/0255003 A1* | 12/2004 | Tecu | ........................ | H04L 67/02 |
| | | | | 709/217 |
| 2005/0091167 A1* | 4/2005 | Moore | .................... | H04L 63/14 |
| | | | | 705/57 |
| 2005/0203851 A1* | 9/2005 | King | ................... | H04L 67/1082 |
| | | | | 705/51 |
| 2007/0094279 A1* | 4/2007 | Mittal | .................. | H04L 67/104 |
| 2008/0098123 A1* | 4/2008 | Huang | ................. | H04L 67/104 |
| | | | | 709/231 |
| 2011/0225312 A1 | 9/2011 | Liu et al. | | |
| 2011/0262104 A1* | 10/2011 | Kiyosawa | .............. | G11B 27/10 |
| | | | | 386/241 |
| 2018/0063232 A1 | 3/2018 | Chau | | |
| 2020/0228582 A1* | 7/2020 | Houze | ................. | H04L 65/4069 |

FOREIGN PATENT DOCUMENTS

| | | |
|---|---|---|
| CN | 104320672 A | 1/2015 |
| CN | 104348647 A | 2/2015 |
| CN | 109167820 A | 1/2019 |
| CN | 109862065 A | 6/2019 |
| CN | 110048906 A | 7/2019 |
| CN | 110247985 A | 9/2019 |

OTHER PUBLICATIONS

Wangsu Science & Technology Co., Ltd., International Search Report, PCT/CN2020/074959, Dec. 2, 2020, 4 pgs.
Wangsu Science & Technology Co., Ltd., CN Notice of Grant and Search Report, CN201911319000.7, dated Jun. 3, 2021, 4 pgs.
Wangsu Science & Technology Co., Ltd., Extended European Search Report, EP20716685.1, dated May 17, 2021, 12 pgs.
Budhkar et al., "An overlay management strategy to improve QoS in CDN-P2P live streaming systems," *Peer-to-Peer Networking and Applications*, Springer, US, vol. 13, No. 1, Apr. 25, 2019, 17 pgs.
Wei et al., "QoE Oriented Chunk Scheduling in P2P-VoD Streaming System," *IEEE Transactions on Vehicular Technology*, NJ, US, vol. 68, No. 8, Aug. 1, 2019, 14 pgs.

* cited by examiner

METHOD AND DEVICE FOR DOWNLOADING RESOURCE FILE

CROSS REFERENCE TO RELATED APPLICATIONS

The present disclosure is a continuation of PCT Patent Application No. PCT/CN2020/074959, filed Feb. 12, 2020, entitled "METHOD AND DEVICE FOR DOWNLOADING RESOURCE FILE," which claims priority to Chinese Patent Application No. 201911319000.7, filed Dec. 19, 2019, entitled "METHOD AND DEVICE FOR DOWNLOADING RESOURCE FILE," each of which is incorporated by reference herein in its entirety.

TECHNICAL FIELD

The present disclosure relates to data transmission technologies, and in particular, to a method and a device for downloading a resource file.

BACKGROUND

P2P (peer-To-peer) technology is a communication technology that performs data transmission based on a peer-to-peer network, which establishes a client-to-client direct communication mechanism. In the peer-to-peer network, each node serves not only as a client, but also as a server for other nodes. In order to reduce a load pressure of a CDN node and save traffic cost of a content delivery network (CDN), a scheme for transmitting data blocks of a resource file based on the peer-to-peer network has been introduced on the basis of a CDN system.

A CDN service provider may deploy in advance a large number of devices with good performance as super peer nodes in the peer-to-peer network in a distributed manner, or select some clients with preferable network quality and device performance as the super peer nodes. The super peer nodes may download and store the data blocks of the resource file from a CDN server in advance. In this way, the client may request a list of nodes from a Tracker server when a certain resource file needs to be acquired, and the Tracker server may feed back node information of the nodes (which may include normal peer nodes, super peer nodes and/or CDN nodes) that have stored corresponding resource files to the client. Thus, the client may select some of the nodes and establish data connection with these nodes, thereby acquiring the data blocks of the resource files stored thereon from these nodes.

The inventor finds that the existing technology at least has the following problems. The client usually selects the node according to a bandwidth state of a network line between each node before the client downloads the data block of the resource file through the CDN node, the super peer node and the normal peer node at the same time. In this way, on the one hand, a download efficiency of the resource file is greatly affected if the resource file stored on the selected node is incomplete. On the other hand, the client is more probable to select the CDN node or the super peer node to download the resource file, which leads to over-high load of the CDN node and the super peer node and long-term idleness of a large number of normal peer nodes, thereby resulting in a low resource utilization rate of the peer-to-peer network.

SUMMARY

In order to solve the problems of the existing technology, embodiments of the present disclosure provide a method and a device for downloading a resource file, using the following technical solutions. In a first aspect, the method for downloading the resource file is provided, which is applied to a client in a peer-to-peer network, and the method includes:

receiving a download request for a target resource file, and determining a data block download sequence of the target resource file;

adjusting a download priority of each of data blocks of the target resource file in real time according to the data block download sequence and a data block consumption progress of the target resource file; and downloading the data blocks of the target resource file through a plurality of download paths with different network qualities based on the adjusted download priority of each of the data blocks.

In a second aspect, the device for downloading the resource file is provided, which is applied to a peer-to-peer network, and the device includes:

a download preparation module, configured to receive a download request for a target resource file, and determine a data block download sequence of the target resource file;

a download adjustment module, configured to adjust a download priority of each of data blocks of the target resource file in real time according to the data block download sequence and a data block consumption progress of the target resource file; and a download control module, configured to download the data blocks of the target resource file through a plurality of download paths with different network qualities based on the adjusted download priority of each of the data blocks.

In a third aspect, a client is provided, where the client includes a processor and a memory, the memory stores at least one instruction, at least one program, a code set or an instruction set, and the at least one instruction, the at least one program, the code set or the instruction set is loaded and executed by the processor to perform the method for downloading the resource file as described in the first aspect.

In a fourth aspect, a computer readable storage medium is provided, where the storage medium stores at least one instruction, at least one program, a code set or an instruction set, and the at least one instruction, the at least one program, the code set or the instruction set is loaded and executed by a processor to perform the method for downloading the resource file as described in the first aspect.

The technical solutions provided by the embodiments of the present disclosure have the following beneficial effects. In the embodiments of the present disclosure, the download request for the target resource file is received, and the data block download sequence of the target resource file is determined; the download priority of each of the data blocks of the target resource file is adjusted in real time according to the data block download sequence and the data block consumption progress of the target resource file; and the data blocks of the target resource file are downloaded through the plurality of download paths with the different network qualities based on the adjusted download priority of each of the data blocks. In this way, when the client downloads the resource file using the P2P technology, different download priorities are configured for different data blocks, and then the download paths with the different network qualities are selected to download the resource file at the same time based on the download priority, so that the data download process of each of the download paths can be effectively controlled, which not only ensures a download efficiency of the resource file, but also improves a resource utilization rate of high-quality nodes in the peer-to-peer network.

BRIEF DESCRIPTION OF THE DRAWINGS

In order to illustrate the technical solutions in the embodiments of the present disclosure more clearly, the attached drawings required in the description of the embodiments are briefly described below. It is apparent that the drawings described below are merely some embodiments of the present disclosure. For those of ordinary skills in the art, other drawings may also be obtained based on these drawings without any creative works.

DETAILED DESCRIPTION

Figure 1:
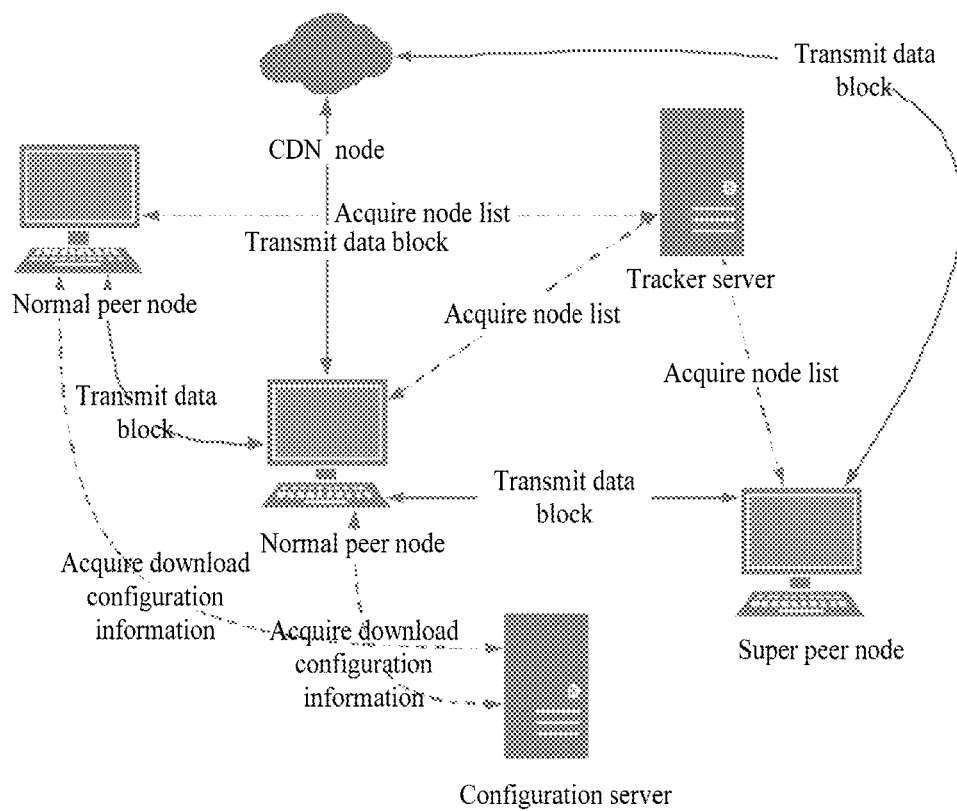
FIG. 1 is a schematic architectural diagram of a peer-to-peer network provided in an embodiment of the present disclosure.

In order to make the objectives, technical solutions, and advantages of the present disclosure more clear, the embodiments of the present disclosure are described in detail in combination with the accompanying drawings hereafter.

An embodiment of the present disclosure provides a method for downloading a resource file, which may be applied to a client in a peer-to-peer network and specifically executed by a SDK auxiliary program installed on the client. Herein, the peer-to-peer network may include a large number of nodes, each of the nodes may be used as a data downloader (i.e., the client) to a download resource file from other nodes in a form of data blocks using a P2P technology, and each of the nodes may also be used as a data provider (i.e., a server) to provide the stored resource file to other nodes in the form of data blocks using the P2P technology. The nodes in the peer-to-peer network may be CDN nodes, super peer nodes or normal peer nodes. The client may simultaneously establish data connections with a plurality of servers and support to simultaneously download the data blocks of the resource file from the plurality of servers. The SDK auxiliary program may be an auxiliary program independent of a P2P download program, which is configured to acquire a download request for the resource file of the P2P download program and download a corresponding resource file based on the method disclosed in this embodiment.

The peer-to-peer network may further include a configuration server and a Tracker server. Herein, the configuration server is mainly configured to record and externally provide a network address of the Tracker server. In the present disclosure, the configuration server may also be configured to store download configuration information of the resource file. The download configuration information may at least include data block information of the resource file, and optionally, may also include a minimum consumption rate of the resource file and a data cache capacity corresponding to each of download paths. The data block information of the resource file may be a total number and size of the data blocks of the resource file and a corresponding data position of each of the data blocks in the resource file. The minimum consumption rate of the resource file may be set by a provider of the resource file and indicates a lower limit of an acquisition rate of the data block required by the P2P download program when the resource file is downloaded. There may be a plurality of data connections with the same or similar network quality in one download path, and different download paths are distinguished according to different network qualities. The client may download the data blocks of the resource file from other nodes through the plurality of data connections in the plurality of download paths simultaneously. The data cache capacity corresponding to the download path may be set by the provider of the resource file and indicates a size of a storage space corresponding to the data blocks downloaded by the client through the different download paths. For different resource files, the size of the data cache capacity corresponding to the same download path may also be different.

In this embodiment, three download paths are taken as examples for illustration, which includes downloading from the CDN node, downloading from the super peer node and downloading from normal peer node (which may be called as a CDN path, a P2SP path and a P2P path in turn). Different download paths are mainly distinguished by difference in the network quality. The processing is similar in the case of two, four or more download paths, which is not detailed herein again. A specific architecture of the peer-to-peer network may be shown in FIG. 1.

Figure 2:
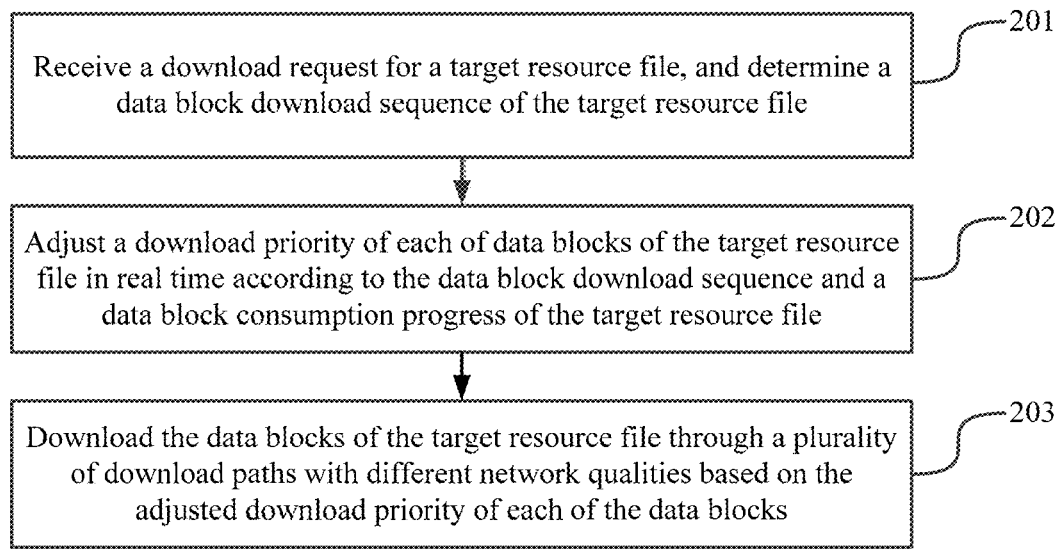
FIG. 2 is a flow chart of a method for downloading a resource file provided in an embodiment of the present disclosure.

A processing flow shown in FIG. 2 is described in detail in combination with a specific embodiment, the contents of which may be as follows. In step 201, a download request for a target resource file is received, and a data block download sequence of the target resource file is determined.

During implementation, when a user wants to acquire the target resource file through the client, the P2P download program installed on the client may be opened, and identification information of the target resource file is input into the P2P download program, so that the P2P download program may start to execute a download task of the target resource file. Meanwhile, the SDK auxiliary program on the client may be enabled automatically after the download task of the target resource file is started, so as to assist the P2P download program to download the target resource file. Specifically, the SDK auxiliary program may receive the download request for the target resource file sent by the P2P download program and acquire the data block information of the target resource file from the configuration server in the peer-to-peer network according to the identification information of the target resource file carried in the download request. Of course, in other embodiments, the SDK auxiliary program may also acquire the data block information of the target resource file by other means. For example, the download request sent by the P2P download program carries the corresponding data block information, or the SDK auxiliary program acquires the corresponding data block information from other nodes or servers in the peer-to-peer network.

Hereafter, the SDK auxiliary program may determine the data block download sequence of the target resource file based on the data block information. Generally speaking, the data block download sequence of the target resource file may be determined according to corresponding data positions of the data blocks in the resource file, that is, the data blocks are downloaded one by one from the data block at the front of the data position to the back by default. However, under special circumstances, the data block download sequence of the target resource file may be automatically adjusted according to actual needs. If a data content of a designated part needs to be downloaded first and a data content of a beginning part is not important, the data block download sequence corresponding to the designated part may be advanced and the data block download sequence corresponding to the beginning part may be adjusted to a later sequence. It should be noted that this embodiment mainly introduces a download process of the resource file, but this process is also applicable to a process of downloading only some data blocks in the resource file, which is only different in a determination process of the data block download sequence.

In addition, after acquiring the data block information of the target resource file, the SDK auxiliary program may trigger the client to initiate a connection to the Tracker server according to access information of the Tracker server recorded therein to acquire a node list of the target resource file. Thus, the SDK auxiliary program may select the CDN node, the super peer node and the normal peer node in the node list, and trigger the client to download the resource files from these nodes.

In step 202, a download priority of each of the data blocks of the target resource file is adjusted in real time according to the data block download sequence and a data block consumption progress of the target resource file.

During implementation, the SDK auxiliary program may further acquire the data block consumption progress of the target resource file after determining the data block download sequence of the target resource file, and then adjust the download priority of each of the data blocks of the target resource file in real time according to the data block download sequence and the data block consumption progress. Herein, the download priority of the data block belongs to intermediate data in the download process, and may be a judgment standard used only to complete the download without generating a specific value. The download priority of the data block that has a higher download sequence and needs to be downloaded in a shorter time is higher. A plurality of data blocks may correspond to the same download priority, or each of the data blocks may respectively correspond to a download priority. After a certain data block has been downloaded, the SDK auxiliary program provides the data block to the P2P download program, which means that the data block is consumed. Specifically, at an initial stage of downloading, the data block consumption progress is zero, so the data block with the highest data block download sequence has the highest download priority. During the downloading process, if the data block consumption progress is that an $n^{th}$ data block has been provided to the P2P download program, an $(n+1)^{th}$ data block and subsequent data blocks have the highest download priority, where n and n+1 are both sort numbers of the data block download sequence, the values of which are positive integers.

In step 203, the data blocks of the target resource file are downloaded through a plurality of download paths with the different network qualities based on the adjusted download priority of each of the data blocks.

During implementation, the SDK auxiliary program may download the data blocks of the target resource file through the plurality of download paths based on the download priority of each of the data blocks and the network quality of each of the download paths while adjusting the download priority of each of the data blocks. First, the SDK auxiliary program may retrieve pre-established correspondences between the download paths with the different network qualities and the download priorities. As shown in Table 1, the download paths with one of the network qualities may correspond to one or more download priorities, 1 is the highest download priority, and the download priorities from 2 to n decreases in sequence. The network quality of the download path A is the highest network quality, and the network qualities of the subsequent download paths decreases in sequence. In addition, n is the lowest download priority and the corresponding data block is not downloaded currently, so the corresponding download path is "None".

TABLE 1

| Download priority | Network quality |
|---|---|
| 1 | Download path A |
| 2 | Download path B |
| 3 | |
| 4 | Download path C |
| 5 | |
| 6 | |
| ... | ... |
| n | None |

Hereafter, the SDK auxiliary program may determine the download priority corresponding to each of the download paths according to the above correspondences, so as to determine a data download range corresponding to each of the download paths. In this way, for each of the download paths, the SDK auxiliary program may download the data blocks within the corresponding data download range through the download path.

Specifically, assuming that there are three download paths with the different network qualities including a CDN path, a P2SP path and a P2P path, the download priorities of the data blocks may be divided into four groups of "high", "medium", "primary" and "low" according to a sequence from high to low. Then, the SDK auxiliary program may download the data blocks corresponding to the "high" group through the download path with the highest network quality (i.e., the CDN path), download the data blocks corresponding to the "medium" group through the download path with the medium network quality (i.e., the P2SP path), and download the data blocks corresponding to the "primary" group through the download path with the lower network quality (i.e., the P2P path) at the same time. The data blocks corresponding to the "low" group may be not downloaded temporarily. Hereafter, the SDK auxiliary program may provide the downloaded data blocks to the P2P download program, thereby realizing the download processing of the target resource file.

In this embodiment, since the download priority of the same data block varies with changes in the data block consumption progress, there may be two cases including successful or unsuccessful download when downloading a certain data block through the download path with a certain network quality. For the data block that is successfully downloaded, there is no need to repeatedly download the data block even if the download priority of the data block changes. However, for the data block that is unsuccessfully downloaded, the SDK auxiliary program may download the data block through a new download path after the download priority of the data block changes.

In one embodiment, when setting the download priority of the data block, the data cache capacity corresponding to each of the download paths may be used for reference, and the corresponding processing may be as follows: adjusting the download priority of each of the data blocks of the target resource file in real time according to the data block download sequence and the data block consumption progress of the target resource file as well as the data cache capacity and the network quality that correspond to each of the download paths.

During implementation, due to a limited storage space of the client, a corresponding data cache capacity may be set for each of the download paths in general. When a total amount of data blocks downloaded through a certain download path reaches the corresponding data cache capacity, the SDK auxiliary program stops downloading data blocks through this download path. However, the SDK auxiliary program may continue to download the data blocks through the download path after the SDK auxiliary program provides the downloaded data blocks to the P2P download program and deletes the corresponding data blocks from a cache space. In this way, when determining the download priority of each of the data blocks, the SDK auxiliary program may adjust the download priority of each of the data blocks of the target resource file in real time according to the data block download sequence and the data block consumption progress of the target resource file as well as the data cache capacity and the network quality that correspond to each of the download paths.

During the process, the SDK auxiliary program may first determine the data blocks to be provided to the P2P download program according to the data block download sequence and the data block consumption progress of the target resource file, and then determine a data download window corresponding to each of the download paths in real time according to the data cache capacity corresponding to each of the download paths. When the data block is in a certain data download window, the SDK auxiliary program may download the data block through the corresponding download path. Hereafter, the SDK auxiliary program may set different download priorities for the data blocks in different data download windows according to the network quality of each of the download paths. Herein, the higher the network quality of the download path, the higher the download priority of the data block in the corresponding data download window thereof. In this way, by setting the data cache capacity, not only the download processes of the different download paths may be effectively controlled, but also cache resources of the client may be saved, thereby preventing the client from data reading and writing blocking caused by caching a large number of data blocks.

Figure 3:
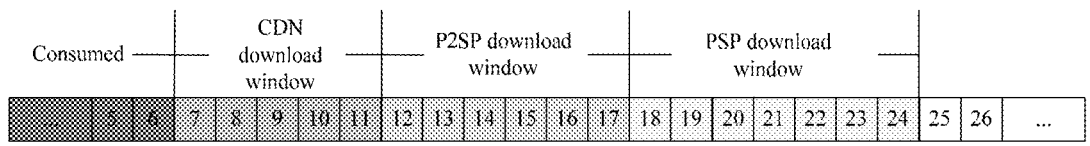
FIG. 3 is a schematic diagram of a principle for setting a download priority provided in an embodiment of the present disclosure.

As shown in FIG. 3, assuming that there are three download paths with different network qualities including the CDN path, the P2SP path and the P2P path, the corresponding data cache capacities are respectively equivalent to sizes of "5", "6" and "7" data blocks of the target resource file, and the data block download sequence is subject to the numbers marked on the data blocks in the figure. The current data block consumption progress is a $6^{th}$ data block, so the data download window corresponding to the CDN path (called as a CDN download window for short) contains $7^{th}$ to $11^{th}$ data blocks, and download priorities thereof may be high. The data download window corresponding to the P2SP path (called as a P2SP download window for short) contains $12^{th}$ to $17^{th}$ data blocks, and download priorities thereof may be medium. The data download window corresponding to the P2P path (called as a P2P download window for short) contains $18^{th}$ to $24^{th}$ data blocks, and download priorities thereof may be primary. Download priorities of $25^{th}$ and subsequent data blocks are low.

In one embodiment, the minimum consumption rate of the data resource file may be ensured by setting the download priorities of the data blocks, and the corresponding processing may be as follows: adjusting the download priority of each of the data blocks of the target resource file in real time according to the data block download sequence and the data block consumption progress of the target resource file as well as the minimum consumption rate of the target resource file.

During implementation, the minimum consumption rate of the corresponding data block may be set for the resource file in order to realize functions of some resource files in the peer-to-peer network. For example, some video resource files is able to be played while being downloaded. Therefore, in order to ensure smooth video playing, a certain minimum consumption rate needs to be set. In other words, smooth video playing may be realized only when the SDK auxiliary program provides the data blocks to the P2P download program at a rate greater than the minimum consumption rate. In this way, the SDK auxiliary program may acquire the minimum consumption progress of the target resource file from the configuration server, and then continuously adjust the download priority of each of the data blocks of the target resource file in combination with the data block download sequence and the data block consumption progress of the target resource file.

Specifically, the SDK auxiliary program may first calculate a data block coverage area corresponding to each of preset download priorities, i.e., the number of the data blocks corresponding to each of the download priorities, according to the minimum consumption rate of the target resource file and a preset data block size of the target resource file. Hereafter, the SDK auxiliary program may determine the data blocks corresponding to each of the data block coverage areas in real time in a data block queue of the target resource file according to the data block download sequence and the data block consumption progress of the target resource file, thereby realizing the adjustment to the download priority of each of the data blocks of the target resource file.

Figure 4:
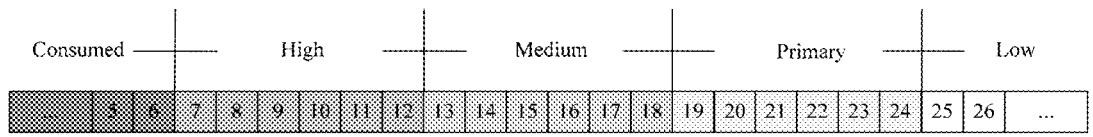
FIG. 4 is a schematic diagram of another principle for setting a download priority provided in an embodiment of the present disclosure.

As shown in FIG. 4, the minimum consumption rate of the target resource file is 150 M/s and the preset data block size is 25 M per block, so the SDK auxiliary program needs to provide at least 6 data blocks per second. The data block download sequence is subjected to the numbers marked on the data blocks in the figure, and the current data block consumption progress is the $6^{th}$ data block. The preset download priorities include "high", "medium", "primary" and "low" download priorities, and the data block coverage area corresponding to each of the download priorities may be set to 6 data blocks. Then the download priorities of the $7^{th}$ to $12^{th}$ blocks are "high", the download priorities of the $13^{th}$ to $18^{th}$ blocks are medium, the download priorities of the $19^{th}$ to $24^{th}$ blocks are primary, and the download priorities of the $25^{th}$ and subsequent blocks are low. Of course, when setting the data block coverage area corresponding to each of the download priorities, the data block consumption rate is only used for reference, and a specific size of the data block coverage area may be adjusted according to the needs of different scenarios.

In one embodiment, when downloading the data blocks through a plurality of download paths, the selection of the download paths may be adjusted according to a data download speed of each of the download paths. Accordingly, the processing of step 203 may be as follows: setting a priority increasing threshold corresponding to each of the download paths according to the data download speed of each of the download paths and the minimum consumption rate of the target resource file; determining a data download range corresponding to each of the download paths based on the adjusted download priority of each of the data blocks and the network qualities of different download paths; and selecting a target download path, for the data blocks within any one of data download ranges, based on the priority increasing threshold and a random number, and downloading the data blocks through the target download path.

During implementation, the SDK auxiliary program may periodically detect the data download speed of each of the download paths while downloading the data blocks of the target resource file. For example, a total amount of data downloaded through the download path A within a preset period may be counted, and then a calculated average download speed within the preset period may be used as the data download speed of the download path A. In this way, the SDK auxiliary program may set the priority increasing threshold corresponding to each of the download paths according to the detected data download speed of each of the download paths and the minimum consumption rate of the target resource file. Herein, since the download path with the highest network quality corresponds to the highest download priority, there is no need to increase the corresponding download priority thereof. Therefore, the data download speed of the download path may be not detected, and the download path does not have any corresponding priority promoting threshold as well. Specifically, taking the existence of three download paths with the different network qualities such as the CDN path, the P2SP path and the P2P path as an example, the data download speeds are $V_{cdn}$, $V_{p2sp}$ and $V_{p2p}$ in sequence, and the minimum consumption rate is $V_{min}$. When $V_{p2p} \geq V_{min}$, a value of the priority increasing threshold of the P2P path is the highest, and the value of the priority increasing threshold of the P2SP path is the highest. When $V_{p2p} < V_{min}$ and $V_{p2sp} + V_{p2p} \geq V_{min}$, the value of the priority increasing threshold of the P2P path may be reduced to a certain extent according to a difference between $V_{p2p}$ and $V_{min}$, and the value of the priority increasing threshold of the P2SP path is the highest. When $V_{p2sp} + V_{p2p} < V_{min}$, the value of the priority increasing threshold of the P2P path may be greatly reduced according to the difference between $V_{p2p}$ and $V_{min}$, and the value of the priority increasing threshold of the P2SP path may be reduced to a certain extent according to the difference between $V_{p2sp} + V_{p2p}$ and $V_{min}$. It should be noted that specific values of the priority increasing thresholds in the above process may be obtained based on practical data, which are not specifically limited in this embodiment.

Meanwhile, the SDK auxiliary program may determine the data download range corresponding to each of the download paths based on the adjusted download priority of each of the data blocks and the network qualities of the different download paths. Hereafter, for the data blocks within any one of the data download ranges, the SDK auxiliary program may first determine a download path X corresponding to the data download range to which the data block belongs when downloading this data block, and then select one random number within the value range of the priority increasing threshold and judge whether the random number is greater than the priority increasing threshold corresponding to the download path X. If the random number is greater than the priority increasing threshold corresponding to the download path X, the priority of the data block may be increased, that is, a download path X−1 with the network quality one level higher than the network quality of the download path X is taken as the target download path. If the random number is smaller than the priority increasing threshold corresponding to the download path X, the priority of the data block does not need to be increased, and the download path X may be taken as the target download path. In this way, the SDK auxiliary program may download the above data blocks through the selected target download path. It may be understood that, in the above process, a real-time network quality of each of the download paths is detected to judge whether the download condition of the data block is able to meet the consumption condition of the data block, the priority increasing threshold is adjusted in real time according to a judgment result, and then the download speed of the data block is controlled as a whole using a random number mechanism, so that not only node resources corresponding to the high-quality download paths may be saved when the network qualities are generally good, but also the minimum consumption rate of the resource file may be satisfied when the network qualities are generally poor.

In one embodiment, it is considered that the high-quality download paths may be used as many as possible to complete the downloading of the entire resource file as soon as possible when downloading the data blocks. Accordingly, the processing of step 203 may be as follows: downloading the data blocks of the target resource file through the plurality of download paths with the different network qualities based on the adjusted download priority of each of the data blocks and node load conditions corresponding to the different download paths.

During implementation, the SDK auxiliary program may continuously detect the node load conditions corresponding to the different download paths in the process of downloading the data blocks of the target resource file. If it is found that the load of the download path with better network quality is lower, original downloading the data blocks through the download path with lower network quality may be replaced with downloading the data blocks through the download path with better network quality on the basis that the download path corresponding to each of the data blocks is determined according to the download priority. However, if the load of the download path with better network quality is higher, the download path of each of the data blocks may be determined according to the download priority, and then the corresponding data block may be directly downloaded by using the determined download path. For example, for the existence of three paths including the CDN path, the P2SP path and the P2P path, when the load of the CDN node is detected to be low, some of the data blocks originally preset to be downloaded through the P2SP path may then be downloaded through the CDN path, and at the same time, some of the data blocks originally preset to be downloaded through the P2P path may then be downloaded through the P2SP path. When the load of the super peer node is detected to be low, some of the data blocks originally preset to be downloaded through the P2P path may then be downloaded through the P2SP path. In this way, the node/bandwidth resources of the high-quality download paths may be fully utilized to complete the download of the resource file as soon as possible, thereby improving the user experience.

In the embodiment of the present disclosure, the download request for the target resource file is received, and the data block download sequence of the target resource file is determined; the download priority of each of the data blocks of the target resource file is adjusted in real time according to the data block download sequence and the data block consumption progress of the target resource file; and the data blocks of the target resource file are downloaded through the plurality of download paths with different network qualities based on the adjusted download priority of each of the data blocks. In this way, when the client downloads the resource file using the P2P technology, different download priorities are configured for different data blocks, and then the download paths with the different network qualities are selected to download the resource file at the same time based on the download priority, so that the data download process of each of the download paths may be effectively controlled, which not only ensures a download efficiency of the resource file, but also improves a resource utilization rate of high-quality nodes in the peer-to-peer network.

Figure 5:
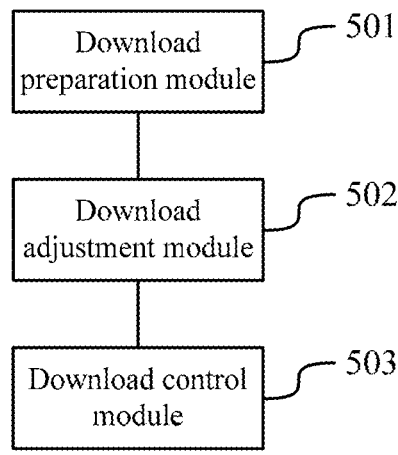
FIG. 5 is a schematic structural diagram of a device for downloading a resource file provided in an embodiment of the present disclosure.

Based on the same technical concept, an embodiment of the present disclosure also provides a device for downloading a resource file which is applied to a peer-to-peer network. As shown in FIG. 5, the device includes:

a download preparation module 501, configured to receive a download request for a target resource file and determine a data block download sequence of the target resource file;

a download adjustment module 502, configured to adjust a download priority of each of data blocks of the target resource file in real time according to the data block download sequence and a data block consumption progress of the target resource file; and a download control module 503, configured to download the data blocks of the target resource file through a plurality of download paths with different network qualities based on the adjusted download priority of each of the data blocks.

In one embodiment, the download adjustment module 502 is configured to:

determine a data download window corresponding to each of the download paths in real time according to the data block download sequence and the data block consumption progress of the target resource file as well as a data cache capacity corresponding to each of the download paths; and set different download priorities for the data blocks in different data download windows according to the network quality of each of the download paths.

In one embodiment, the download adjustment module 502 is configured to:

set a data block coverage area corresponding to each of preset download priorities according to a minimum consumption rate of the target resource file; and adjust the download priority of each of the data blocks of the target resource file in real time according to the data block download sequence and the data block consumption progress of the target resource file as well as the data block coverage area.

Figure 6:
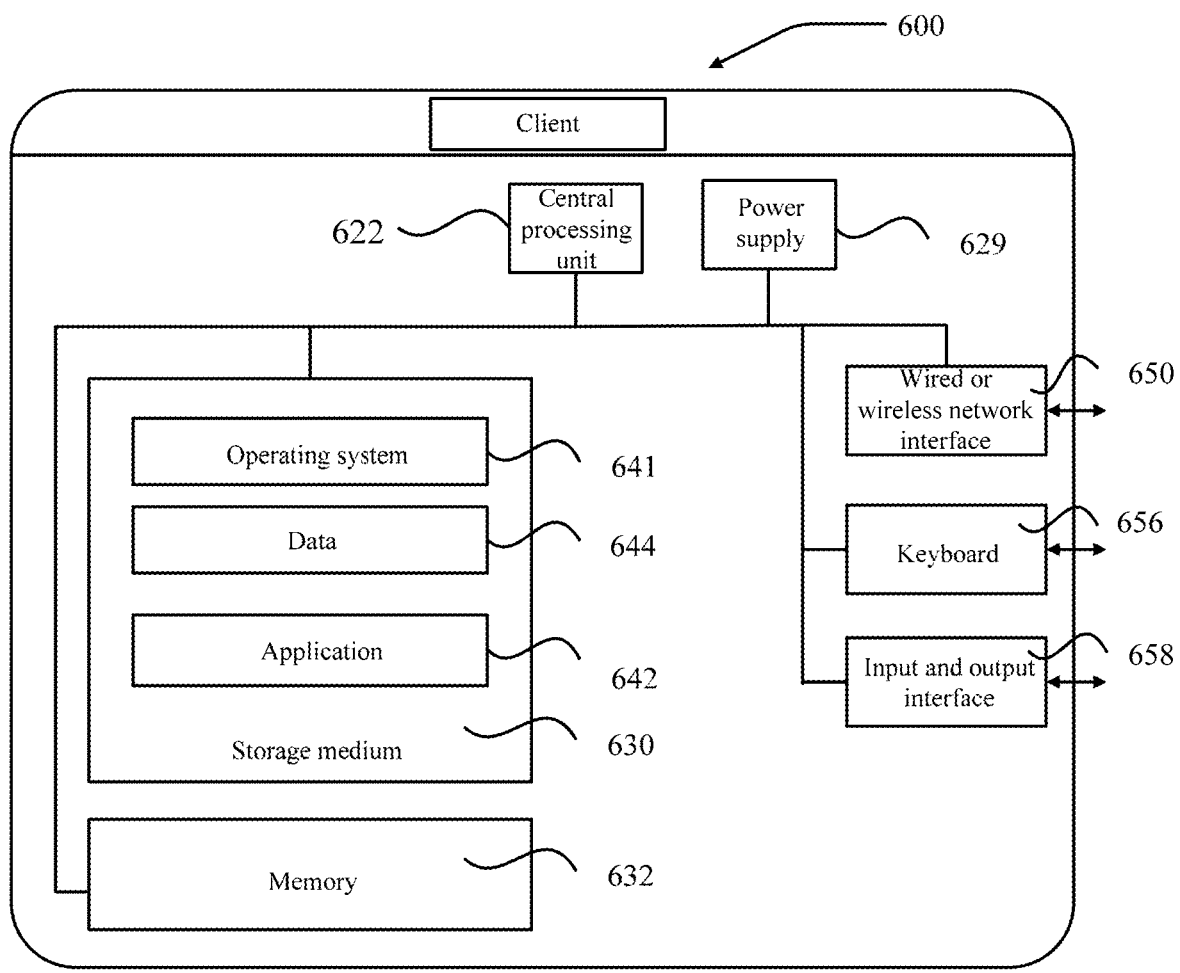
FIG. 6 is a schematic structural diagram of a client provided in an embodiment of the present disclosure.

FIG. 6 is a schematic structural diagram of a client provided by an embodiment of the present disclosure. The client 600 may have relatively large differences due to different configurations or performances, and may include one or more central processing units 622 (e.g., one or more processors) and a memory 632, one or more storage medium 630 (e.g., one or more mass storage devices) storing an application 642 or data 644. Herein, the memory 632 and the storage medium 630 may be in the form of temporary storage or persistent storage. The program stored in the storage medium 630 may include one or more modules (which is not shown in the figure), and each module may include a series of instruction operations to the client 600. In this embodiment, the central processing unit 622 may be configured to communicate with the storage medium 630 and execute the series of instruction operations in the storage medium 630 on the client 600.

The client 600 may also include one or more power supplies 629, one or more wired or wireless network interfaces 650, one or more input and output interfaces 658, one or more keyboards 656, and/or one or more operating systems 641 such as Windows Server, Mac OS X, Unix, Linux, FreeBSD, and the like.

The client 600 may include a memory and one or more programs, where the one or more programs are stored in the memory and configured to be executed by one or more processors, and the one or more programs contains the instruction for performing the above resource file downloading.

Those of ordinary skills in the art may understand that all or some steps in the above embodiments may be implemented by hardware or by instructing relevant hardware through a program. The program may be stored in a computer-readable storage medium and the storage medium mentioned above may be a read-only memory, a magnetic disk, an optical disk, or the like.

Those described above are merely some embodiments of the present disclosure, which are not intended to limit the present disclosure. Any modification, equivalent replacement and improvement within the spirit and principle of the present disclosure shall be included in the protection scope of the present disclosure.

What is claimed is:

1. A method for downloading a resource file, applied to a client in a peer-to-peer network, comprising:
   receiving a download request for a target resource file, and determining a data block download sequence of the target resource file;
   adjusting a download priority of each of data blocks of the target resource file in real time according to the data block download sequence and a data block consumption progress of the target resource file; and
   downloading the data blocks of the target resource file through a plurality of download paths based on the adjusted download priority of each of the data blocks; wherein
   the plurality of download paths are distinguished according to different network qualities, and have pre-established correspondences to download priorities; and
   downloading the data blocks of the target resource file through the plurality of download paths based on the adjusted download priority of each of the data blocks comprises:
     determining a data download range corresponding to a respective one of the plurality of download paths according to the pre-established correspondences; and
     downloading data blocks within the data download range through the respective one of the download paths.

2. The method according to claim 1, wherein the download paths comprise downloading from a CDN node, downloading from a super peer node and/or downloading from a normal peer node.

3. The method according to claim 1, wherein adjusting the download priority of each of the data blocks of the target resource file in real time according to the data block download sequence and the data block consumption progress of the target resource file comprises:
   adjusting the download priority of each of the data blocks of the target resource file in real time according to the data block download sequence and the data block consumption progress of the target resource file as well as a data cache capacity and a network quality that correspond to each of the download paths.

4. The method according to claim 3, wherein adjusting the download priority of each of the data blocks of the target resource file in real time according to the data block download sequence and the data block consumption progress of the target resource file as well as the data cache capacity and the network quality that correspond to each of the download paths comprises:
  determining a data download window corresponding to each of the download paths in real time according to the data block download sequence and the data block consumption progress of the target resource file as well as the data cache capacity corresponding to each of the download paths; and
  setting different download priorities for the data blocks in different data download windows according to the network quality of each of the download paths.

5. The method according to claim 1, wherein adjusting the download priority of each of the data blocks of the target resource file in real time according to the data block download sequence and the data block consumption progress of the target resource file comprises:
  adjusting the download priority of each of the data blocks of the target resource file in real time according to the data block download sequence and the data block consumption progress of the target resource file as well as a minimum consumption rate of the target resource file.

6. The method according to claim 5, wherein adjusting the download priority of each of the data blocks of the target resource file in real time according to the data block download sequence and the data block consumption progress of the target resource file as well as the minimum consumption rate of the target resource file comprises:
  setting a data block coverage area corresponding to each of preset download priorities according to the minimum consumption rate of the target resource file; and
  adjusting the download priority of each of the data blocks of the target resource file in real time according to the data block download sequence and the data block consumption progress of the target resource file as well as the data block coverage area.

7. The method according to claim 1, wherein downloading the data blocks of the target resource file through the plurality of download paths with different network qualities based on the adjusted download priority of each of the data blocks comprises:
  setting a priority increasing threshold corresponding to each of the download paths according to a data download speed of each of the download paths and a minimum consumption rate of the target resource file;
  determining a data download range corresponding to each of the download paths based on the adjusted download priority of each of the data blocks and the network qualities of different download paths; and
  selecting, for the data blocks within any one of data download ranges, a target download path based on the priority increasing threshold and a random number, and downloading the data blocks through the target download path.

8. The method according to claim 1, wherein after receiving the download request for the target resource file, the method further comprises:
  acquiring download configuration information of the target resource file from a preset configuration server in the peer-to-peer network, wherein the download configuration information comprises data block information and a minimum consumption rate of the target resource file and a data cache capacity corresponding to each of the download paths.

9. The method according to claim 1, wherein downloading the data blocks of the target resource file through the plurality of download paths with different network qualities based on the adjusted download priority of each of the data blocks comprises:
  downloading the data blocks of the target resource file through the plurality of download paths with the different network qualities based on the adjusted download priority of each of the data blocks and node load conditions corresponding to different download paths.

10. A client, comprising a processor and a memory, wherein the memory stores at least one instruction, at least one program, a code set or an instruction set, and the at least one instruction, the at least one program, the code set or the instruction set is loaded and executed by the processor to perform the following method:
  receiving a download request for a target resource file, and determining a data block download sequence of the target resource file;
  adjusting a download priority of each of data blocks of the target resource file in real time according to the data block download sequence and a data block consumption progress of the target resource file; and
  downloading the data blocks of the target resource file through a plurality of download paths based on the adjusted download priority of each of the data blocks; wherein
  the plurality of download paths are distinguished according to different network qualities, and have pre-established correspondences to download priorities; and
  downloading the data blocks of the target resource file through the plurality of download paths based on the adjusted download priority of each of the data blocks comprises:
    determining a data download range corresponding to a respective one of the plurality of download paths according to the pre-established correspondences; and
    downloading data blocks within the data download range through the respective one of the download paths.

11. The client according to claim 10, wherein the download paths comprise downloading from a CDN node, downloading from a super peer node and/or downloading from a normal peer node.

12. The client according to claim 10, wherein adjusting the download priority of each of the data blocks of the target resource file in real time according to the data block download sequence and the data block consumption progress of the target resource file comprises:
  adjusting the download priority of each of the data blocks of the target resource file in real time according to the data block download sequence and the data block consumption progress of the target resource file as well as a data cache capacity and a network quality that correspond to each of the download paths.

13. The client according to claim 12, wherein adjusting the download priority of each of the data blocks of the target resource file in real time according to the data block download sequence and the data block consumption progress of the target resource file as well as the data cache capacity and the network quality that correspond to each of the download paths comprises:

determining a data download window corresponding to each of the download paths in real time according to the data block download sequence and the data block consumption progress of the target resource file as well as the data cache capacity corresponding to each of the download paths; and setting different download priorities for the data blocks in different data download windows according to the network quality of each of the download paths.

14. The client according to claim 10, wherein adjusting the download priority of each of the data blocks of the target resource file in real time according to the data block download sequence and the data block consumption progress of the target resource file comprises:

adjusting the download priority of each of the data blocks of the target resource file in real time according to the data block download sequence and the data block consumption progress of the target resource file as well as a minimum consumption rate of the target resource file.

15. The client according to claim 14, wherein adjusting the download priority of each of the data blocks of the target resource file in real time according to the data block download sequence and the data block consumption progress of the target resource file as well as the minimum consumption rate of the target resource file comprises:

setting a data block coverage area corresponding to each of preset download priorities according to the minimum consumption rate of the target resource file; and adjusting the download priority of each of the data blocks of the target resource file in real time according to the data block download sequence and the data block consumption progress of the target resource file as well as the data block coverage area.

16. The client according to claim 10, wherein downloading the data blocks of the target resource file through the plurality of download paths with different network qualities based on the adjusted download priority of each of the data blocks comprises:

setting a priority increasing threshold corresponding to each of the download paths according to a data download speed of each of the download paths and a minimum consumption rate of the target resource file;

determining a data download range corresponding to each of the download paths based on the adjusted download priority of each of the data blocks and the network qualities of different download paths; and selecting, for the data blocks within any one of data download ranges, a target download path based on the priority increasing threshold and a random number, and downloading the data blocks through the target download path.

17. The client according to claim 10, wherein after receiving the download request for the target resource file, the method further comprises:

acquiring download configuration information of the target resource file from a preset configuration server in a peer-to-peer network, wherein the download configuration information comprises data block information and a minimum consumption rate of the target resource file and a data cache capacity corresponding to each of the download paths.

18. A computer readable storage medium, wherein the storage medium stores at least one instruction, at least one program, a code set or an instruction set, and the at least one instruction, the at least one program, the code set or the instruction set is loaded and executed by a processor to perform the following method:

receiving a download request for a target resource file, and determining a data block download sequence of the target resource file;

adjusting a download priority of each of data blocks of the target resource file in real time according to the data block download sequence and a data block consumption progress of the target resource file; and downloading the data blocks of the target resource file through a plurality of download paths based on the adjusted download priority of each of the data blocks; wherein the plurality of download paths are distinguished according to different network qualities, and have pre-established correspondences to download priorities; and downloading the data blocks of the target resource file through the plurality of download paths based on the adjusted download priority of each of the data blocks comprises:

determining a data download range corresponding to a respective one of the plurality of download paths according to the pre-established correspondences; and downloading data blocks within the data download range through the respective one of the download paths.

* * * * *